US012780141B2

(12) United States Patent
Maier et al.

(10) Patent No.: US 12,780,141 B2
(45) Date of Patent: Nov. 3, 2026

(54) VEHICLE OCCUPANT PROTECTION HAVING AN AIRBAG

(71) Applicant: ZF AUTOMOTIVE GERMANY GMBH, Alfdorf (DE)

(72) Inventors: Nico Maier, Alfdorf (DE); Benjamin Weimer, Spraitbach (DE); Erik Hanle, Überlingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 19/104,723

(22) PCT Filed: Aug. 15, 2023

(86) PCT No.: PCT/EP2023/072437
§ 371 (c)(1),
(2) Date: Feb. 19, 2025

(87) PCT Pub. No.: WO2024/038039
PCT Pub. Date: Feb. 22, 2024

(65) Prior Publication Data

US 2026/0054680 A1 Feb. 26, 2026

(30) Foreign Application Priority Data

Aug. 19, 2022 (DE) ..................... 10 2022 121 001.4
May 31, 2023 (DE) ..................... 10 2023 114 229.1

(51) Int. Cl.
*B60R 21/231* (2011.01)
*B60R 21/20* (2011.01)
(Continued)

(52) U.S. Cl.
CPC ............ *B60R 21/231* (2013.01); *B60R 21/20* (2013.01); *B60R 21/233* (2013.01);
(Continued)

(58) Field of Classification Search
CPC .................................................... B60R 21/233
See application file for complete search history.

(56) References Cited

U.S. PATENT DOCUMENTS 4,099,743 A * 7/1978 Non ........................ B60R 21/02
280/753
6,142,521 A 11/2000 Shepard
(Continued)

FOREIGN PATENT DOCUMENTS

DE 102010045693 A1 5/2011
DE 102019114894 A1 2/2020
(Continued)

OTHER PUBLICATIONS

PCT International Search Report of the corresponding patent application PCT/EP2023/072437 date of mailing Oct. 30, 2023.

*Primary Examiner* — Nicole T Verley
(74) *Attorney, Agent, or Firm* — Tarolli, Sundheim, Covell & Tummino LLP

(57) ABSTRACT

In a vehicle occupant protection system (10) comprising an airbag (12) which is arranged, prior to activation of the vehicle occupant protection system (10), folded on a floor (30) of a vehicle in front of an associated vehicle seat (16) and which deploys, in a situation of restraint, from the bottom (30) in front of the vehicle seat (16), the airbag (12) has several tubular inflatable chambers (18) being in fluid connection which, when inflated, are connected three-dimensionally to one another, wherein several of the chambers (18) form support struts (24) of the airbag (12), while at least one of the chambers (18) forms a restraint chamber (22) in an upper area of the airbag (12).

15 Claims, 4 Drawing Sheets

(51) Int. Cl.

| | |
|---|---|
| ***B60R 21/233*** | (2006.01) |
| ***B60R 21/2338*** | (2011.01) |
| *B60R 21/00* | (2006.01) |

(52) U.S. Cl.

CPC .. *B60R 21/2338* (2013.01); *B60R 2021/0053* (2013.01); *B60R 2021/23107* (2013.01); *B60R 2021/23169* (2013.01); *B60R 2021/23382* (2013.01); *B60R 2021/23386* (2013.01); *B60R 2021/23388* (2013.01)

(56) References Cited

U.S. PATENT DOCUMENTS

| | | | | |
|---|---|---|---|---|
| 11,148,629 | B2 * | 10/2021 | Sekizuka | B60R 21/231 |
| 11,325,551 | B2 * | 5/2022 | Campbell | B60R 21/20 |
| 11,358,558 | B2 * | 6/2022 | Fischer | B60R 21/2338 |
| 11,577,680 | B1 * | 2/2023 | Faruque | B60R 21/20 |
| 12,042,442 | B1 * | 7/2024 | Jaradi | A61G 3/0808 |
| 12,043,205 | B2 * | 7/2024 | Jaradi | B60R 21/16 |
| 12,060,024 | B1 * | 8/2024 | Palazzolo | B60R 21/233 |
| 2020/0062210 | A1 * | 2/2020 | Fukawatase | B60R 21/231 |
| 2021/0046890 | A1 | 2/2021 | Jayakar et al. | |
| 2021/0107426 | A1 * | 4/2021 | Choi | B60R 21/262 |

FOREIGN PATENT DOCUMENTS

| | | | | |
|---|---|---|---|---|
| DE | 102020120476 | A1 | 2/2022 | |
| JP | 2018008661 | A | 1/2018 | |
| WO | WO-2019168883 | A1 * | 9/2019 | B60N 2/143 |
| WO | 2023006638 | A1 | 2/2023 | |

* cited by examiner

VEHICLE OCCUPANT PROTECTION HAVING AN AIRBAG

RELATED APPLICATIONS

This application is a U.S. National Stage Application filed under 35 USC 371, claiming priority to Serial No. PCT/EP2023/072437, filed on 15 Aug. 2023; which claims priority from DE Patent Application 10 2022 121 001.4, filed 19 Aug. 2022 and DE Patent Application 10 2023 114 229.1, filed 31 May 2023, the entireties of which are hereby incorporated herein by reference.

TECHNICAL FIELD

The invention relates to a vehicle occupant protection system comprising an airbag.

BACKGROUND

In previous vehicle interior concepts, the vehicle occupants only have very limited legroom. While affecting the vehicle occupants'comfort, in situations of restraint this offers the advantage that the legs of the vehicle occupants are basically restrained by components affixed to the vehicle such as the bulkhead, the instrument panel or vehicle seats arranged in front of them. For improving the leg protection, moreover specific knee airbags are known which deploy from the respective structure affixed to the vehicle toward the legs of the vehicle occupant.

In new concepts, particularly in connection with autonomous driving, the vehicle occupants are intended to choose their sitting position inside the vehicle interior more freely. Accordingly, there can also be constellations in which ample legroom is available.

SUMMARY

It is the object of the invention to improve, even in those sitting positions, the protection of the vehicle occupant's legs and the kinematics of the vehicle occupant, specifically of the vehicle occupant's legs.

This is achieved by a vehicle occupant protection system comprising an airbag for the protection of the vehicle occupant's legs which is arranged, prior to activation of the vehicle occupant protection system, folded on a floor of a vehicle in front of an associated vehicle seat and which, in a situation of restraint, deploys from the floor in front of the vehicle seat. The airbag comprises several tubular inflatable chambers in fluid connection which, when inflated, are connected three-dimensionally to one another, wherein several of the chambers form support struts of the airbag, while at least one of the chambers forms a restraint chamber in an upper area of the airbag.

In a situation of restraint, the airbag inter alia offers protection against the legs of the vehicle occupant in the vehicle seat swinging upwards, when the associated vehicle seat offers ample legroom to the front.

It is also conceivable to position the airbag in the area of a structure affixed to the vehicle. In this case, in a situation of restraint it acts as a knee airbag and protects the vehicle occupant's legs from contacting the structure affixed to the vehicle.

The support struts ensure that the airbag assumes its desired three-dimensional shape and stabilize the airbag in said shape. In this way, an airbag can be realized which in total encloses a very large volume but requires only a relatively small amount of filling gas due to the design of inflatable tubular chambers. Therefore, the airbag requires no further support surfaces on components affixed to the vehicle in addition to the floor of the vehicle. The airbag can be designed without great effort by varying the arrangement of the support struts in such a way that the restraint chamber for the respective vehicle and the respective restraint situation under consideration assumes the desired position.

The internal pressure of the support struts can be selected to be higher than in a conventional airbag to improve the form-stabilizing effect. Thanks to the small total volume, for this purpose no more or only insignificantly more filling gas is required than in conventional knee airbags. The airbag in itself is sufficiently resilient to cushion in particular the vehicle occupant's legs, as the tubular chambers, when loaded, yield generally by a certain degree perpendicularly to their longitudinal extension.

The support struts are preferably connected to form a three-dimensional frame. The restraint chamber forms specifically an upper cross strut of the frame, e.g. the cross strut arranged at the top relative to the vertical direction (in the completely inflated airbag).

The areas between the individual tubular chambers are preferably open so that the airbag only consists of the tubular inflatable chambers.

The airbag can have only one single or several specific restraint chambers, e.g. having a larger diameter transversely to their longitudinal extension and, thus, usually also having a larger volume than the support struts in order to obtain more extensive cushioning or better support of the legs of the vehicle occupant. In this case, each of the diameters is considered transversely to the longitudinal extension of the tubular chambers.

As a matter of course, each part of the airbag and each of the tubular chambers, viz. also the support struts, develop a restraining effect when the vehicle occupant contacts them.

The restraint chamber is arranged, when the airbag is completely inflated, preferably directly in front of a shin area or a knee area of the vehicle occupant. In a further embodiment, the restraint chamber may be arranged, when the airbag is completely inflated, in front of a pelvis area of the vehicle occupant. The shape of the airbag can be easily adapted to the respective desired task by selecting the length and the orientation of the support struts. It is not intended to position the restraint chamber above a pelvis area of the vehicle occupant (in relation to the size of a 50% dummy or a 95% dummy) in an airbag according to the invention for protecting the vehicle occupant's legs.

One of the floor-level support struts may be designed, if necessary, to cushion the vehicle occupant's heels in the area of the vehicle floor and thus to stop the forward movement of the vehicle occupant.

The support struts are designed and arranged, for example, so that, when the airbag is inflated, there is room for the vehicle occupant's legs in the area beneath the restraint chamber so that centrally beneath the restraint chamber the airbag has a free space in which the legs can swing upwards and can be cushioned by the lower side of the restraint chamber, which can particularly prevent the legs from swinging upwards.

When completely inflated, the airbag can take the shape of a wedge-shaped frame with at least two support struts extending diagonally downwards away from the vehicle seat which support the airbag on the floor. Said diagonal support struts form a supporting triangle with vertically and horizontally extending further support struts, for example, to both longitudinal ends of the restraint chamber. A lower end of the diagonal support struts can be connected to a rear cross strut extending along the floor. Moreover, there can be provided further support struts which additionally stabilize the shape. In general, the airbag is intended to constitute a frame dimensionally stable in itself.

In order to anchor the airbag on the floor, at least at the lower ends of the vertical support struts and/or the diagonal support struts, for example, appropriate holding fixtures can be arranged, such as fabric tabs which can be formed already on the cutting of the airbag. Said holding fixtures are connected to holding structures affixed to the vehicle on the floor of the vehicle, for example by hooking or screwing.

Preferably, all tubular chambers, viz. both the support struts and the restraint chamber, are in fluid connection with one another.

The vehicle occupant protection system preferably comprises at least one inflator which supplies filling gas to the airbag and is fastened to the floor of the vehicle.

For example, the inflator can be in fluid connection with one of the floor-level support struts, preferably the rearmost support strut as seen from the vehicle seat, such as by an inlet in the middle of the longitudinal extension of said support strut. In order to achieve preferably rapid inflation of the airbag, two inflators may be provided. They are positioned, for example, in the area of the two longitudinal ends of the rearmost support strut.

The fluid connection can be such that the inflator is connected directly to the support strut or via a possibly flexible gas feed line which leads to the airbag and is in fluid connection with the support strut. The latter case allows the option to mount the inflator(s) remote from the airbag.

The total volume of the airbag can be about 30 l, for example.

The inflator and/or the folded airbag are accommodated, prior to activation, in a holder in the floor of the vehicle, for example, so that they are not noticed by the vehicle occupant in the vehicle interior. For example, a complete airbag module that contains the airbag and the inflator(s) may be accommodated in the floor. In order to conceal the airbag module prior to activation, it can be mounted on a rotatable plate, for example, which is arranged above the holder so that, prior to activation, the airbag module is counter-sunk in the floor and, in a situation of restraint, is swiveled upward before the filling gas flows into the airbag.

For additional stabilization, the airbag can be braced via at least one tether. Bracing is also possible between individual support struts.

The tether is an integral part of a cutting of the airbag, for example.

It is also conceivable to replace the diagonal support struts with tethers which extend diagonally from the longitudinal ends of the restraint chamber to the floor of the vehicle.

The manufacture of the airbag can be facilitated when the airbag has an elongated cutting that can be folded several times in its longitudinal direction while forming folding lines extending transversely to the longitudinal direction (L), wherein flatly superimposed portions of the cutting are interconnected so that the tubular chambers are formed. In this case, the tubular chambers are not sewn together of individual fabric tubes but are formed by sewing up (or connecting otherwise) two flatly superimposed cutting portions between said cutting portions. Alternatively, such an airbag can be manufactured by a one-piece weaving method (One Piece Woven). The recesses between the support struts in the inflated airbag can be realized by cutouts or indentations in the cutting. It is conceivable to design the complete cutting in one piece, but it is also possible to design, for example, a front side of the restraint chamber and of the vertical support struts as a second cutting part.

Appropriately positioned non-inflatable areas in the cutting, preferably at the folding lines, define the angle between the individual support struts easily via additional seams in the finished airbag.

The fluid connections between the individual tubular chambers can also be predefined by the course of the seams.

The seams can have a curved design or can be gathered seams, for example, depending on the position in order to obtain the desired shape of the inflated airbag.

In order to reduce the load on the seams by inflowing filling gas, it is possible to position gas guiding layers or reinforcing layers in the respective areas inside the airbag. If two inflators or two gas injection points are provided, a folded gas guiding layer can extend over the entire width of the airbag inside the support struts used for gas injection.

In another embodiment, an additional restraint chamber is present which, when the airbag is fully inflated, is arranged in parallel to the restraint chamber and directly adjacent to the restraint chamber between the restraint chamber and the floor of the vehicle. The additional restraint chamber is preferably located in the same plane as the restraint chamber and the vertical support struts which are adjacent to the side of the restraint chamber. The additional restraint chamber helps to cushion the vehicle occupant's legs safely and to prevent them from being overstretched.

In particular, at least one overflow opening through which filling gas flows from the restraint chamber into the additional restraint chamber is positioned between the restraint chamber and the additional restraint chamber. The additional restraint chamber is preferably filled exclusively by a fluid connection to the restraint chamber so that filling gas flows always through the restraint chamber into the additional restraint chamber. Thus, the additional restraint chamber generally does not deploy before the restraint chamber has at least started to fill up.

The internal volumes of the restraint chamber and the additional restraint chamber are preferably separated from each other by a partition in which the at least one overflow opening is formed. The partition advantageously extends over the entire length of the additional restraint chamber in the transverse direction of the vehicle. For example, several overflow openings are arranged along the connecting line so that the additional restraint chamber can be filled quickly and evenly over its entire length.

A cutting of the additional restraint chamber preferably is part of the elongated cutting of the airbag so that the additional restraint chamber can be manufactured easily together with the other inflatable chambers of the airbag.

In order to position and, if necessary, stabilize the additional restraint chamber quickly and safely at the desired position, the additional restraint chamber can support on the support struts, for example via lateral fabric portions. The fabric portions preferably are not inflatable. It should be made sure, however, that the fabric portions do not exert any significant forces upon the support struts so that the three-dimensional shape of the airbag is affected as little as possible by the additional restraint chamber.

As an alternative, or in addition, to the fabric portions, there can be provided tethers which extend between lateral edges of the additional restraint chamber and each of the adjacent vertical support struts, and which position and, if necessary, stabilize the additional restraint chamber. In this case, too, it must be made sure, however, that the tethers are selected as to their position and length such that substantially lateral tensile forces are prevented from being transferred to the vertical support struts.

Preferably, the additional restraint chamber is folded, particularly rolled, in a package separate from the restraint chamber, before it is filled, so that it deploys and is filled later than the restraint chamber. Preferably, the additional restraint chamber deploys only after the remaining airbag has deployed and has assumed its three-dimensional shape. This ensures that the additional restraint chamber does not prevent the support struts from deploying and being filled.

BRIEF DESCRIPTION OF THE DRAWINGS

In the following, the invention will be described in detail on the basis of plural embodiments. The drawings show in.

DESCRIPTION

Like, similar or equally acting components of all embodiments are marked with the same reference signs (or with reference signs increased by 100). For reasons of clarity, all identical components are not always provided with reference signs.

Figure 1:
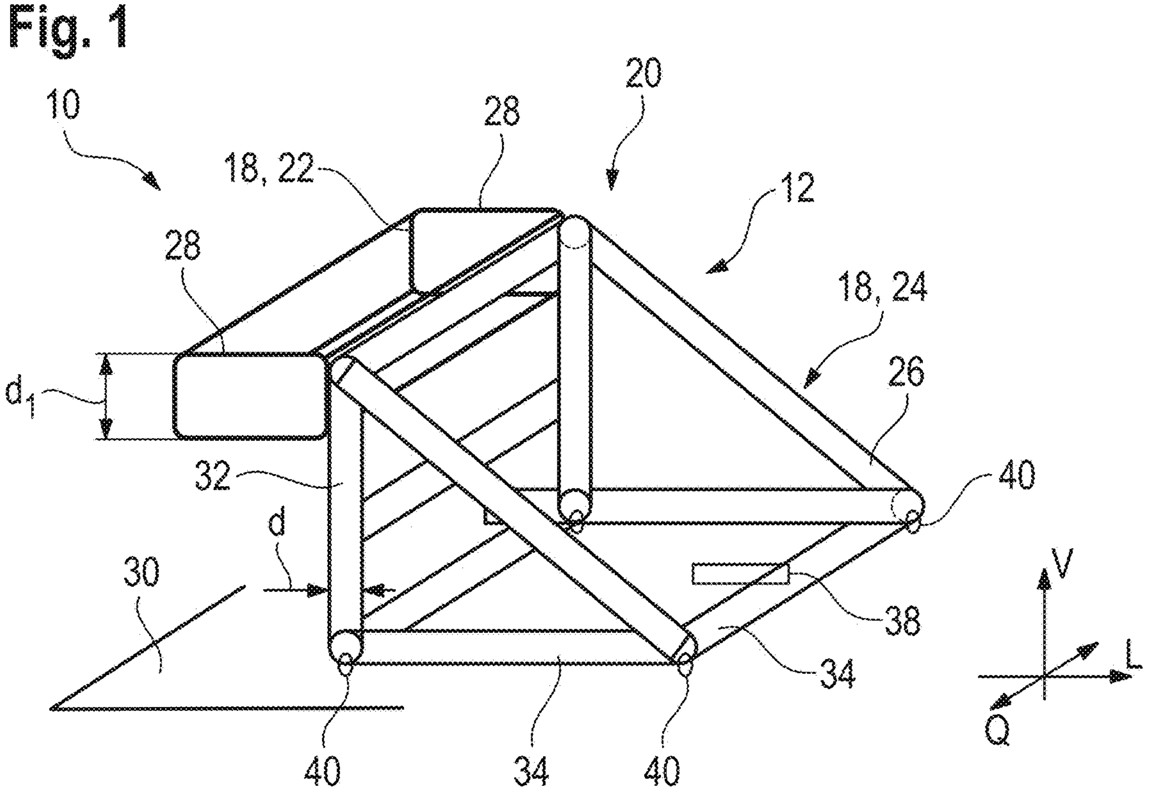
FIG. 1 a schematic perspective view of an airbag of a vehicle occupant protection system according to the invention as set forth in a first embodiment.

FIG. 1 illustrates a vehicle occupant protection system 10 comprising an airbag 12 that is designed for the protection of the legs of a vehicle occupant 14 in a vehicle seat 16 (see FIG. 3) as set forth in a first embodiment, when fully inflated.

The airbag 12 comprises several tubular chambers 18 which are in fluid connection with one another and which together form a type of three-dimensional wedge-shaped frame 20.

The clearances between the tubular chambers 18 are left open. In this embodiment, the airbag 12 is made only of the tubular chambers 18.

One of the tubular chambers 18 is designed as a restraint chamber 22 and in this example has a larger diameter d1 as compared to the diameter d of the remaining tubular chambers 18. The restraint chamber 22 in this case is arranged in the upper area of the airbag 12 on the uppermost (relating to a vertical direction V) and rearmost (relating to a longitudinal direction L facing away from the vehicle seat 16) tubular chamber 18 and extends along a transverse direction Q of the vehicle seat 16 normal to the longitudinal direction L and to the vertical direction V.

The airbag 12 is oriented so that the restraint chamber 22 is located on the side of the airbag 12 facing the vehicle seat 16.

The remaining tubular chambers 18 form support struts 24 that ensure the dimensional stability of the airbag 12. The frame 20 is designed so that the airbag 12, when inflated, is dimensionally stable in itself.

In this example, two diagonal support struts 26 are provided which are attached to the longitudinal ends 28 of the restraint chamber 22 and extend to a floor 30 of the vehicle.

Moreover, two vertical support struts 32 which equally extend to the floor 30 are attached to the longitudinal ends 28 of the restraint chamber 22. The opposite ends of the diagonal support struts 26 and the vertical support struts 32 are connected to each other by floor-level support struts 34. The floor-level support struts 34 in this case form a rectangle that rests on the floor 30. In addition, a further support strut 24 is arranged between the two vertical support struts 32 between the floor-level support struts 34 and the uppermost cross strut connected to the restraint chamber 22.

In this example, the restraint chamber 22 protrudes from the vertical support struts 32 to a certain extent along the longitudinal direction L.

The airbag 12 is in fluid connection with an inflator 38 that supplies filling gas for the airbag 12. The total filling volume of the airbag 12 may be about 30 l, for example.

When not activated, the airbag 12 and the inflator 38 are arranged on the floor 30 of the vehicle. For example, they are concealed in a holder (not shown) in the floor which accommodates an airbag module in which the inflator 38 and the folded airbag 12 are provided.

The airbag 12 is fixed on the floor 30, such as via holding fixtures 40 at the floor-level ends of the diagonal support struts 26 and the vertical support struts 32 which are connected to appropriate holding structures (not shown) on the floor 30.

Figure 2:
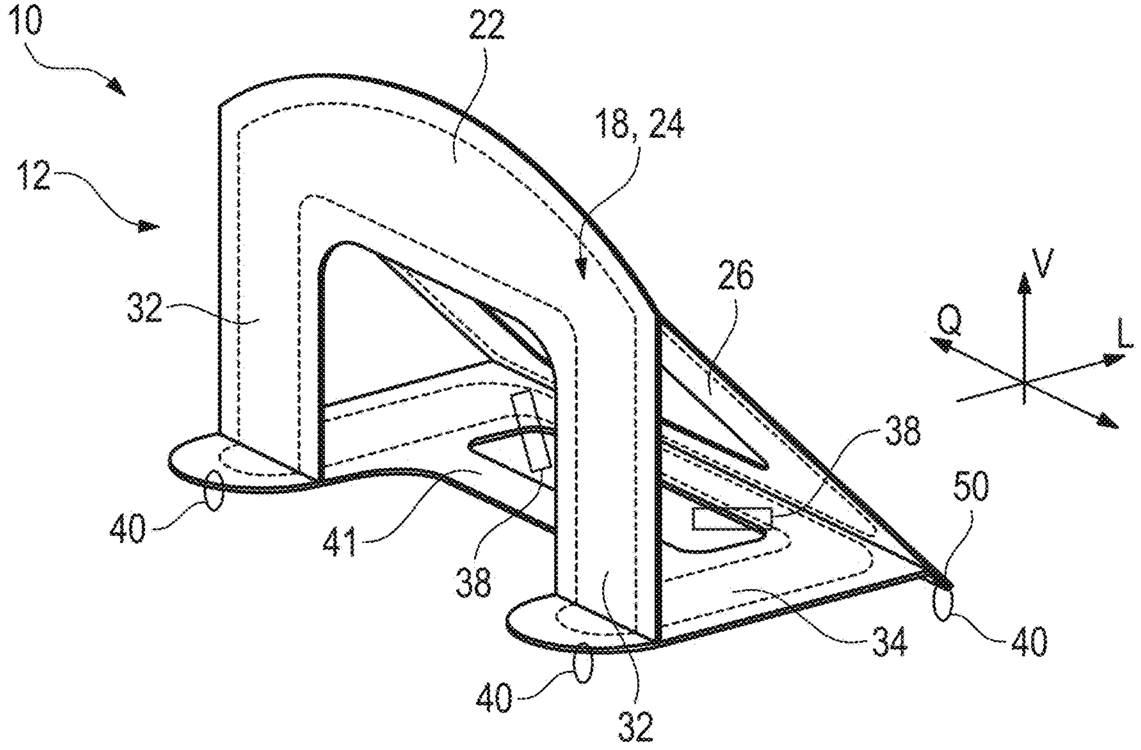
FIG. 2 a schematic perspective view of an airbag of a vehicle occupant protection system according to the invention as set forth in a second embodiment.

FIG. 2 illustrates a second embodiment of the airbag 12. In contrast to the first embodiment, the restraint chamber 22 is aligned above the two vertical support struts 32 in the vertical direction V with the latter, while the central support strut 24 is omitted. Consequently, the two vertical support struts 32 and the restraint chamber 22 constitute a kind of gateway that is delimited on the rear by the two diagonal support struts 26.

Further, the two floor-level support struts 34 extending in the longitudinal direction L are connected to each other by a non-inflatable tether 41.

In this embodiment, two inflators 38 are used which are arranged in the area of the floor-level support struts 34, particularly in the area of the longitudinal ends of the rearmost floor-level support strut 34.

Figure 3:
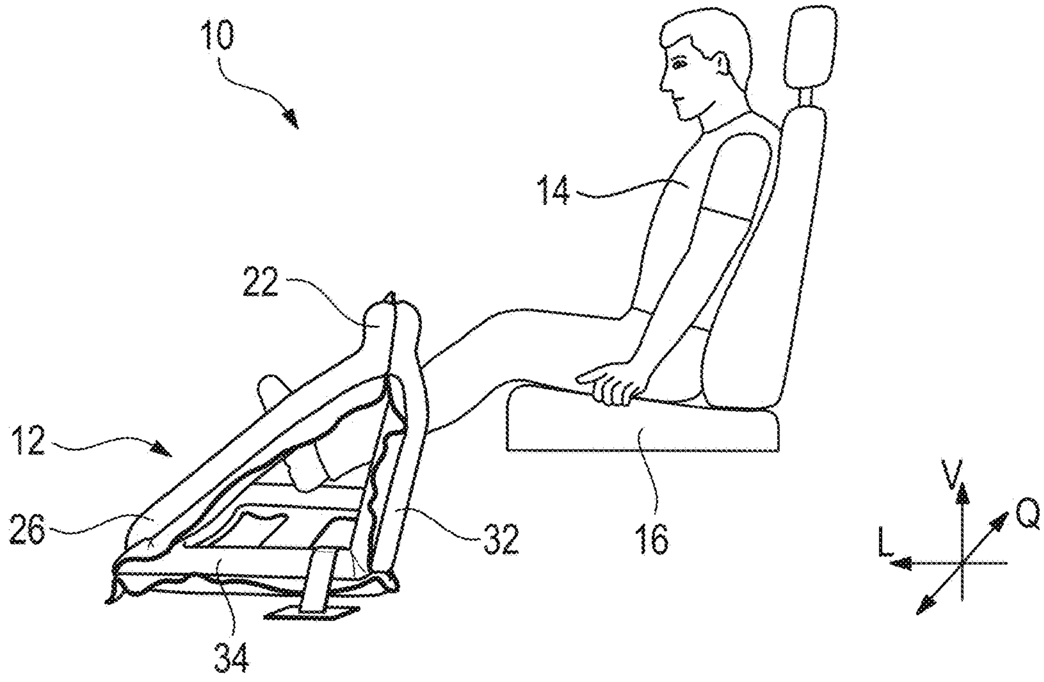
FIG. 3 a schematic view of the vehicle occupant protection system of FIG. 2 in a situation of restraint.

FIG. 3 illustrates the orientation of the airbag 12 relative to the vehicle occupant 14 in a situation of restraint. The diagonal support struts 26 extend away from the vehicle seat 16 to the floor 30 and support the airbag 12 on the floor 30.

If a situation of restraint occurs, the inflator 38 is activated and the airbag 12 is inflated. In doing so, the airbag 12 deploys out of its holder on the floor 30 in curved shape toward the vehicle occupant 14 in the vehicle seat 16 so that the restraint chamber 22 moves from above over the legs of the vehicle occupant 14. As shown in FIG. 3, the restraint chamber 22 cushions the legs of the vehicle occupant 14, when they are swinging upwards.

The floor-level support struts 34 positioned beneath the restraint chamber 22 or the support strut 24 arranged there above are designed in the airbag according to FIG. 1, for example, to cushion the heels of the vehicle occupant 14, if necessary, and to stop a forward movement of the vehicle occupant 14, unless the legs move as indicated in FIG. 3.

As an alternative, the airbag 12 could be arranged in the area of a structure affixed to the vehicle and could be used, e.g., as a knee airbag.

Figure 4:
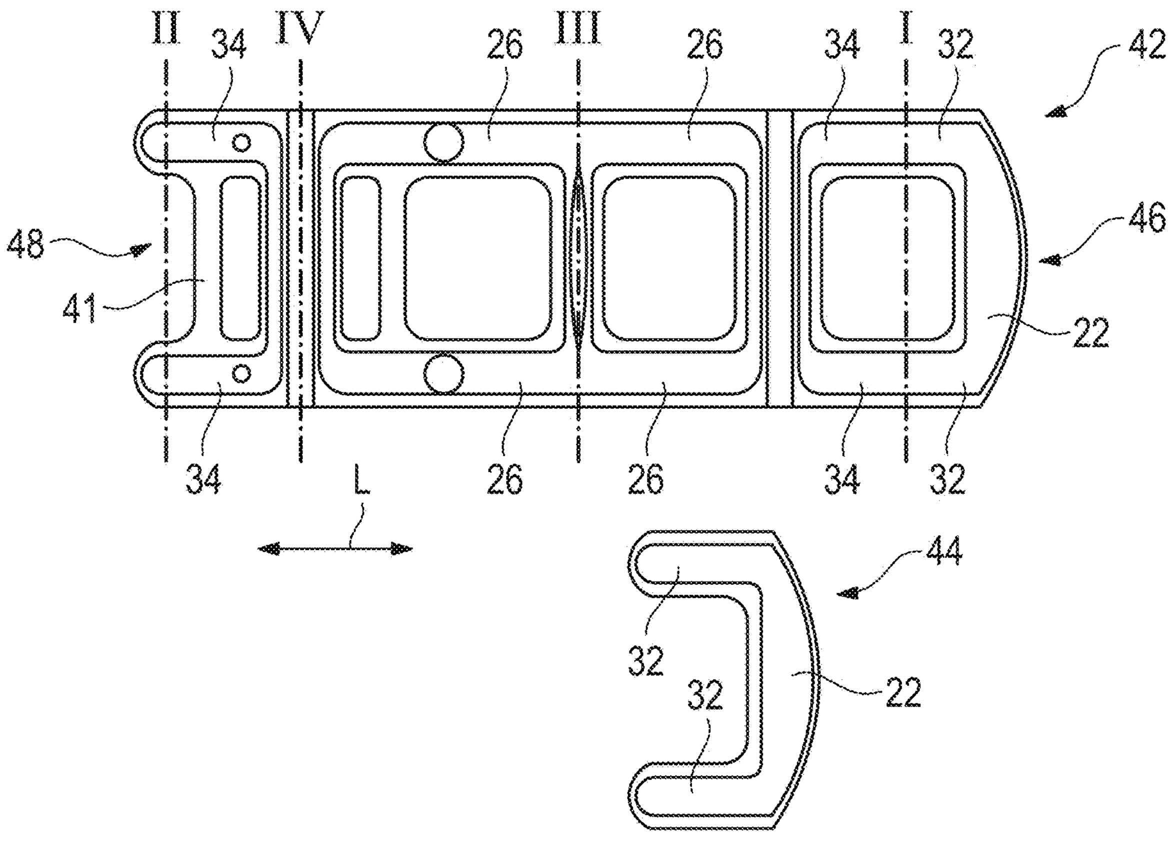
FIG. 4 a flatly spread cutting of the airbag of FIG. 2.

FIG. 4 illustrates the cutting 42, 44 of the airbag 12 of FIG. 2. Except for the front side 44 of the vertical support struts 32 and the restraint chamber 22, the cutting 42 is made of one single piece of a suitable airbag fabric.

The cutting 42 is elongated and is folded several times along the later longitudinal direction L to form the airbag 12. The folded portions are partially sewn to one another along the longitudinal direction L, thereby forming the individual tubular chambers 18. Said seams are indicated by broken lines in FIG. 2. In this way, also overflow openings between the individual tubular chambers 18 are realized.

For example, the right-hand end 46 in FIG. 4 forming the restraint chamber 22 in the finished airbag is folded along the folding line I and is connected to the line II at the left-hand end 48. The remaining cutting is folded again along the folding lines III and IV, thereby forming the diagonal support struts 26, and is sewn up with the end 46 in the area of the folding line III.

The separate front side 44 is sewn up with the ends 48, 46 to complete the vertical support struts 32 and the restraint chamber 22.

Figure 5:
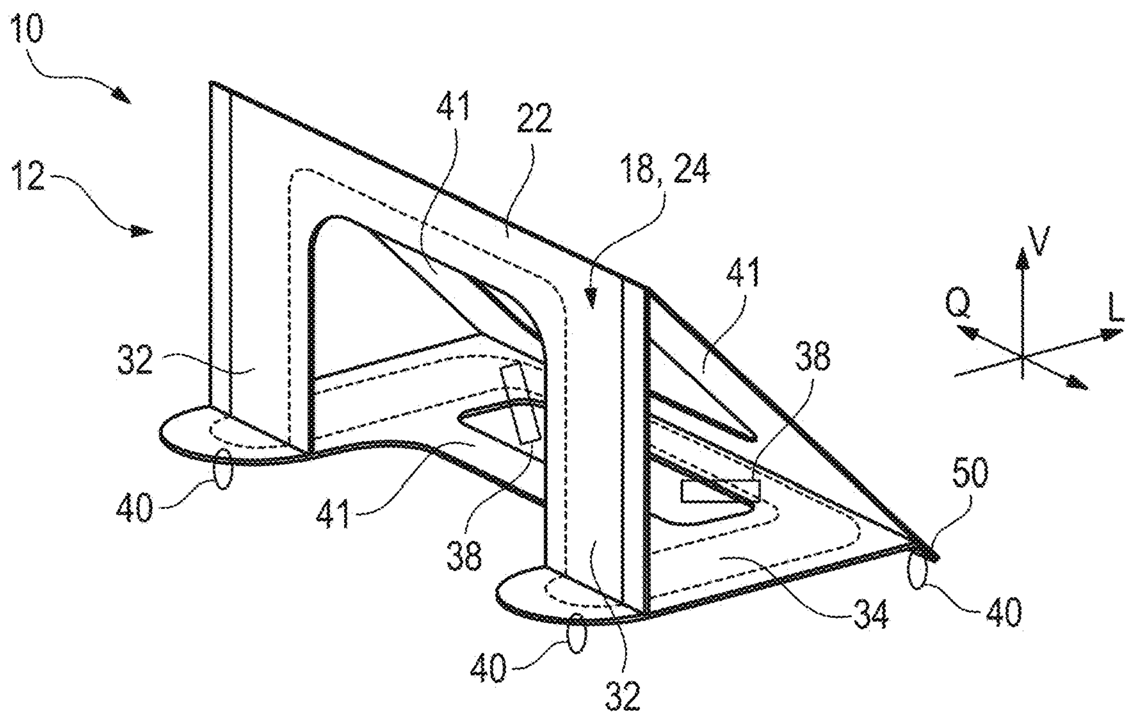
FIG. 5 a schematic perspective view of an airbag of a vehicle occupant protection system according to the invention as set forth in a third embodiment.

In the area of the folding lines III, IV, appropriate darts 50 which define the angles between the individual tubular chambers 18 and/or support struts 24 and impart the desired wedge shape to the inflated airbag 12 are produced by corresponding seams (see FIGS. 2 and 5).

The tether 41 is formed by a portion of the cutting 42 that is not covered with any other matching cutting portion.

Figure 6:
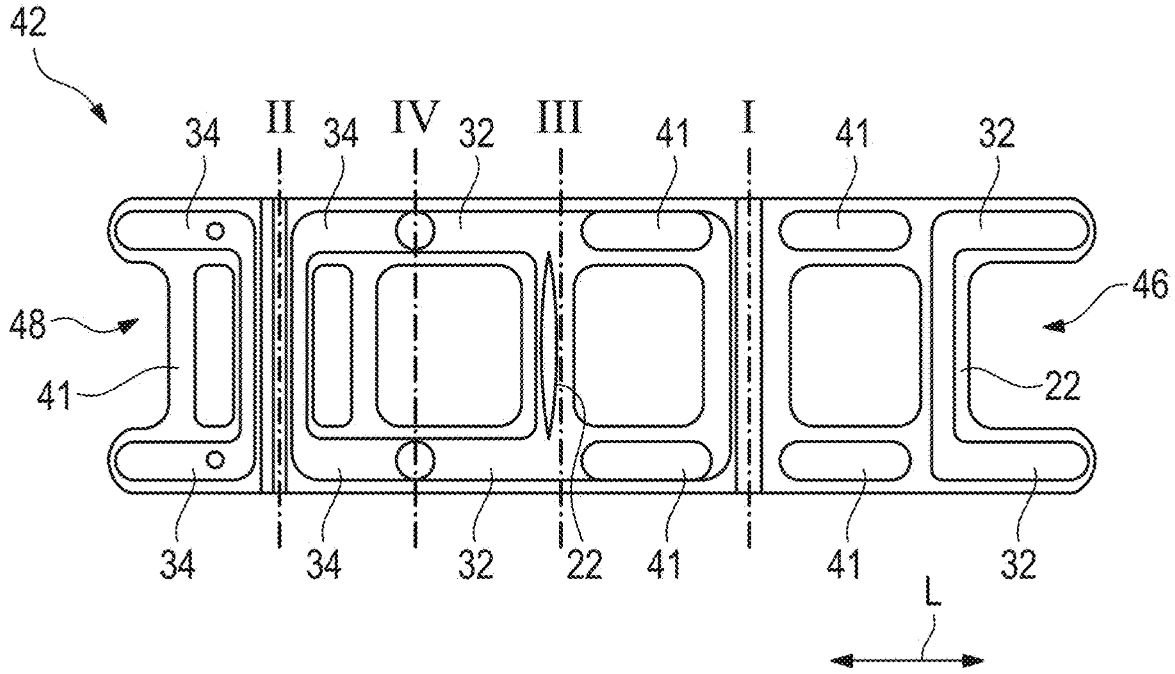
FIG. 6 a flatly spread cutting of the airbag of FIG. 5.

FIGS. 5 and 6 illustrate a third embodiment of the airbag 12 and the cutting 42 thereof. The main difference from the second embodiment resides in the fact that the diagonal support struts are formed by non-inflatable tethers 41.

FIG. 6 illustrates the cutting 42 of the airbag 12 of FIG. 5 which consists of only one single piece of fabric. As in the previous embodiment, the portions of the cutting 42 are appropriately brought into the desired shape by folding about suitable folding lines I, II, III, IV normal to the longitudinal direction L and by sewing the individual cutting portions to each other, wherein also the tubular chambers 18 are formed. The tethers 41 are formed integrally with the cutting 42 and are already connected to the former at their two longitudinal ends so that no further sewing step is required. In this example, two cutting portions are superimposed in the area of the tethers 41, but they are not connected in such a way that inflatable chambers are formed.

In the fourth embodiment of a vehicle occupant protection system 10 shown in FIGS. 7 to 10, the airbag 112 includes an additional restraint chamber 180 in addition to the restraint chamber 22.

The additional restraint chamber 180 extends, when the airbag 112 is completely inflated, in parallel to the restraint chamber 22 and directly adjacent to the latter beneath the restraint chamber 22, viz. between the restraint chamber 22 and the floor 30. Concerning the vertical direction V and the longitudinal direction L, the additional restraint chamber 180 is located in the same plane as the restraint chamber 22 and the vertical support struts 124.

The additional restraint chamber 180 acts, just as the restraint chamber 22, from above upon the feet and the shins of the vehicle occupant 14 and cushions the legs of the vehicle occupant 14 during a collision of the vehicle. The function of the airbag 112 therefore is identical to that shown in the above-described embodiments.

The additional restraint chamber 180 is approximately as long as the restraint chamber 22 in relation to the transverse vehicle direction Q and, when fully inflated, has a similar height in relation to the vertical direction V.

Along the transverse vehicle direction Q, the additional restraint chamber 180 is connected tightly and permanently to the restraint chamber 22 over its entire inflatable area via a partition 184.

In the partition 184, several overflow openings 186 are formed through which filling gas overflows from the restraint chamber 22 into the additional restraint chamber 180, when the restraint chamber 22 is filled. The overflow openings 186 are the only fluid connection of the additional restraint chamber 180 to the remaining airbag 112 so that filling gas flows into the additional restraint chamber 180 only via the restraint chamber 22.

Before filling, the additional restraint chamber 180 in this example is rolled along the vertical direction V into a package 187 separate from the restraint chamber 22 and, in said rolled state, is fixed by a holding device provided with a weakened zone (not shown). The holding device is released only when sufficient filling gas starts to flow from the restraint chamber 22 through the overflow openings 186 into the still rolled additional restraint chamber 180.

In this example, a cutting of the additional restraint chamber 180 is integrated in the cutting 42 of the airbag 12 by further cutting portions for the partition 184 and the additional restraint chamber 180 which are appropriately connected to form the additional restraint chamber 180 (not shown) being arranged adjacent to the cutting portions of the restraint chamber 22.

The additional restraint chamber 180 in this example is laterally connected via two fabric portions 188 to the vertical support struts 24 on each lateral edge 190 of the additional restraint chamber 180. The fabric portions 188 are not inflatable in this case. Optionally, the fabric portions 188 are not tightly fixed to the support struts 24 so that the additional restraint chamber 180 has as little impact as possible on the three-dimensional shape of the airbag 112 when inflated. If necessary, the additional restraint chamber 180 is only supported via the fabric portions 188 by the support struts 24 without being fastened to them.

Figure 7:
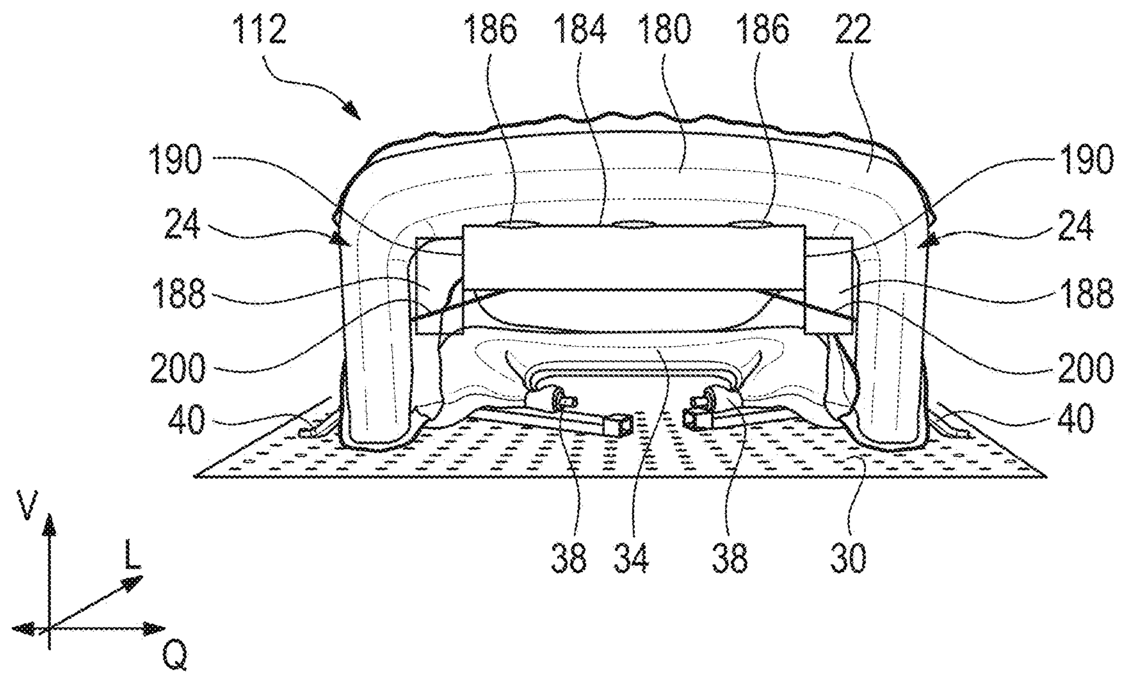
FIG. 7 a schematic perspective view of a vehicle occupant protection system according to the invention as set forth in a fourth embodiment.
Figure 8:
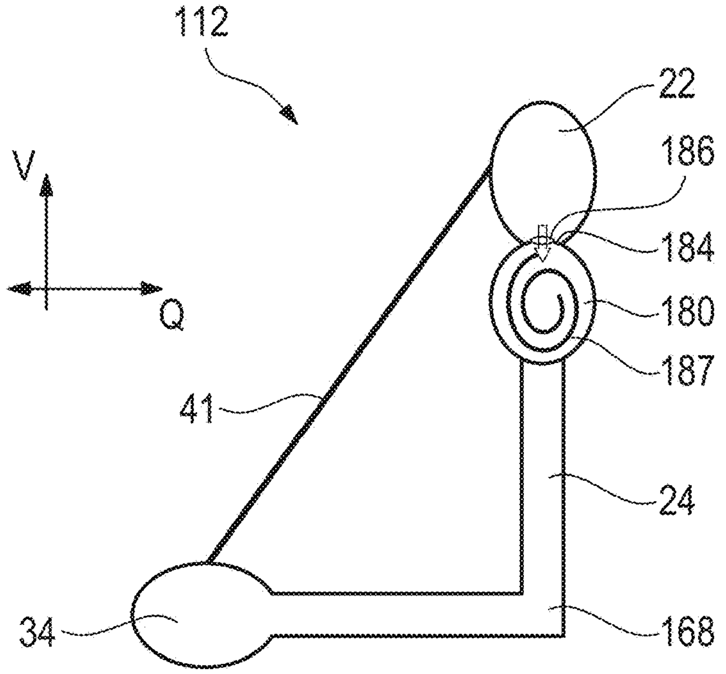
FIG. 8 a schematic lateral view of the airbag of FIG. 7.
Figure 9:
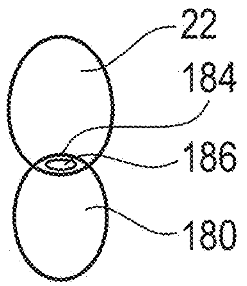
FIG. 9 a schematic detail view of the restraint chamber and the additional restraint chamber of the airbag of FIG. 7.
Figure 10:
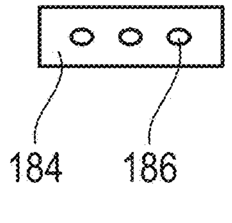
FIG. 10 a schematic view of overflow openings between the restraint chamber and the additional restraint chamber of the airbag of FIG. 7.

As shown in FIG. 7, additional, in this case diagonal, tethers 200 can be provided from the additional restraint chamber 180 to each of the adjacent vertical support struts 24 in order to stabilize the position of the additional restraint chamber 180 in the fully inflated airbag 112. The tethers 200 are designed in such a way that no significant tensile forces are transmitted into the vertical support struts 24.

The features of the individual embodiments can be freely combined or exchanged for one another at the skilled person's discretion.

The invention claimed is:

1. A vehicle occupant protection system comprising an airbag configured to protect the legs of the vehicle occupant, wherein the airbag is configured to be arranged, prior to activation of the vehicle occupant protection system, folded on a floor of a vehicle in front of an associated vehicle seat and which deploys in a situation of restraint from the floor in front of the vehicle seat, wherein the airbag comprises several tubular inflatable chambers being in fluid connection which, when inflated, are connected three-dimensionally to one another, wherein several of the chambers form support struts of the airbag, while at least one of the chambers in an upper area of the airbag forms a restraint chamber, wherein, when the airbag is completely inflated, the restraint chamber is configured to be arranged directly in front of a shin area, a knee area or a pelvis area of the vehicle occupant, and wherein the support struts are configured and arranged so that, when the airbag is inflated, a free space provided beneath the restraint chamber receives upward swinging movement of the legs of the occupant, and so that a lower side of the restraint chamber cushions the upward swinging movement of the legs.

2. The vehicle occupant protection system according to claim 1, wherein the support struts are connected to form a three-dimensional frame and the restraint chamber particularly forms an upper cross strut of the frame.

3. The vehicle occupant protection system according to claim 1, wherein, transversely to its longitudinal extension, the restraint chamber has a larger diameter than the support struts.

4. The vehicle occupant protection system according to claim 1, wherein the support struts are designed and arranged so that, when the airbag is inflated, there is room for the legs of the vehicle occupant in the area beneath the restraint chamber.

5. The vehicle occupant protection system according to claim 1, wherein the airbag, when inflated, includes at least two support struts extending diagonally downwards away from the vehicle seat which support the airbag on the floor.

6. The vehicle occupant protection system according to claim 1, wherein at least one inflator is provided which supplies filling gas to the airbag and which is fastened to the floor of the vehicle.

7. The vehicle occupant protection system according to claim 6, wherein the inflator and/or the folded airbag are, prior to the activation fixed on the floor of the vehicle via holding fixtures.

8. The vehicle occupant protection system according to claim 1, wherein the airbag is braced via at least one tether.

9. The vehicle occupant protection system according to claim 1, wherein the airbag has an elongated cutting that can be folded several times in its longitudinal direction while forming folding lines extending transversely to the longitudinal direction, wherein flatly superimposed portions of the cutting are interconnected so that the tubular chambers are formed.

10. The vehicle occupant protection system according to claim 1, wherein an additional restraint chamber is provided which, when the airbag is completely inflated, is arranged in parallel to the restraint chamber and directly adjacent to the restraint chamber between the restraint chamber and the floor of the vehicle.

11. The vehicle occupant protection system according to claim 10, wherein at least one overflow opening through which filling gas flows from the restraint chamber into the additional restraint chamber is positioned between the restraint chamber and the additional restraint chamber.

12. The vehicle occupant protection system according to claim 10, wherein a cutting of the additional restraint chamber is part of an elongated cutting of the airbag.

13. The vehicle occupant protection system according to claim 10, wherein the additional restraint chamber is supported on the support struts via lateral fabric portions.

14. The vehicle occupant restraint system according to claim 10, wherein the additional restraint chamber is connected to an adjacent support strut in the area of its lateral edges via at least one tether.

15. The vehicle occupant restraint system according to claim 10, wherein the additional restraint chamber is folded, prior to its deployment, into a package separate from the restraint chamber.

* * * * *